Patented Jan. 8, 1935

1,987,109

UNITED STATES PATENT OFFICE 1,987,109

PACKING COMPOSITION

George B. Jack, Jr., South Salem, N. Y., assignor to The Dorin Corporation, Union City, N. J., a corporation of New Jersey No Drawing. Application February 1, 1932, Serial No. 590,311

7 Claims. (Cl. 106—8)

This invention relates to a packing composition and more particularly to a packing composition capable of being used in a loose condition or in a molded state as a lubricant packing between moving parts of mechanical apparatus, as well as for sealing joints or connections between stationary parts.

Prior to this invention, different packing compositions were provided for different uses. This was due to the fact that the components of one packing rendered it incapable of use for purposes other than that for which it was specifically devised. For example, a low pressure steam packing could not successfully be employed for packing joints or parts of high pressure equipment. Likewise, a packing developed for use in equipment and which might contact with ammonia could not be used for packing parts of apparatus wherein it might contact with acids. Even with packings for acid equipment it was necessary to have a different packing for the different classes of acids.

Therefore, in the average plant the variety and number of packings required and employed in the maintenance of equipment were relatively large. As a consequence, the cost of the packing service was considerable.

I have found that by employing unalloyed antimony in powder form I can produce a packing composition which can be used in either a loose or molded state and is not limited in its use but which is capable of wide and extensive industrial application, and consequently eliminate the necessity for a large variety of specific packing compositions of limited use.

It is therefore an object of this invention to provide a packing composition which can be used either in the loose or molded state and is not restricted to a limited application but on the contrary is capable of extensive use for many varied industrial applications including use as a lubricating packing.

A specific object of this invention is to provide a packing composition suitable for many varied industrial applications including use as a lubricating packing which contains unalloyed antimony in powder form as the metallic ingredient thereof, said packing being capable of use in the loose or molded forms.

Other objects will appear from the following description and appended claims.

The above objects are achieved by the present invention which contemplates a packing composition containing as the metallic ingredient thereof, powdered metallic antimony in an unalloyed condition or state. By the expression "antimony in the unalloyed state" is meant metallic antimony which has not been combined with other metals to form alloys but which may contain as impurities thereof a very minor portion of other metals. In the preferred form of the invention, the antimony is powdered to 200 mesh. In addition to the powdered antimony, the composition preferably also comprises suitable fibers or fillers, one or more lubricants and a binder which promotes cohesion between the constituents of the entire mass.

As the fibrous material, asbestos fibers, hemp, flax, etc. or mixtures thereof may be used. Amongst the examples of lubricants which have given satisfactory results may be mentioned graphite and talc. The binder may comprise pitch, heavy mineral oil or preferably rubber compounds, such as crepe latex, para gum rubber or balata, admixed with or dissolved in a suitable solvent with or without modifying ingredients, such as palm oil, and with or without vulcanizing agents or accelerators.

It is apparent that the proportion of the various ingredients constituting the packing mass may vary within wide limits. The antimony content may vary from a relative small percentage, such as 5% or less up to 75% by weight, or even more, depending on the ultimate use of the packing as hereafter illustrated.

A packing for use in condenser tubes is subjected to very low pressures at temperatures not exceeding 120° F. The movement of the condenser tube through the packing is extremely small and measured in thousandths of an inch. The packing of such an application functions chiefly and practically as a gasket. For such service the packing may contain as little as 5% by weight or even less of antimony.

A packing for use in valves operating at pressures not exceeding 125 pounds per square inch at saturated steam temperatures requires a material having a more substantial body because of the wear occasioned by the opening and closing of the valves. For this type of service the antimony content may be from 20% to 30% by weight of the packing.

A packing for use in light duty pumps where pressures are not excessive and temperatures range from atmospheric to 200° F. requires somewhat heavier body than that set forth in the paragraph immediately preceding. For slow speed reciprocating units, the metal content may approximate 25% to 50% by weight of the packing composition. For a higher speed centrifugal pump in similar use, the metal content of the packing is not less than 30% to 50% by weight.

For high pressure pumps handling liquids at elevated temperatures, such as 250° F. to 500° F., the packing contains not less than 60% of antimony.

For superheat valves, expansion joints, etc. and other mechanisms that require free movement regardless of other conditions, the packing should preferably contain a minimum of 75% of antimony. Such packing compositions are also preferred in applications involving chemicals, distillates, oils, etc. and other compounds having solvent or other action against the other components of the packing which are less inert than the antimony.

The specific proportions of the other ingredients may be varied within wide limits as will become apparent to one skilled in the art.

As illustrative examples of packing compositions which have given satisfactory results, the following compositions are set forth:

Example I 12 pounds asbestos fiber
45 pounds powdered metallic antimony
12 pounds graphite
3 gallons rubber compound (consisting of 3 pounds para gum rubber, 2 ounces palm oil, 1½ ounces rubber anti-oxidant, 3 ounces sulphur, 4 ounces zinc oxide, 1 ounce piperidine pentamethylene dithiocarbamate, 12 quarts naphtha)

Example II

| | Pounds. |
|---|---|
| Asbestos spinning fibre | 9 |
| Powdered antimony | 75 |
| Flake graphite | 10 |
| Rubber (naphtha solution containing 10%–15% rubber) | 4 |
| Palm oil | 1¼ |

One mode of preparing the composition comprises introducing the asbestos fibers in a suitable pulping or mixing machine and mixing it with a suitable quantity of the binder until the binder substantially coats the fibers. The powdered antimony is then added, preferably gradually, and the mixing continued until the metallic powder is bonded to and thoroughly covers the surfaces of the asbestos fibers forming metal coated fibers. While the mass is agitated, the remainder of the binder is then added and finally the graphite is introduced. After all the components have been added, the stirring of the mass is continued until it acquires the consistency of heavy dough or putty.

It is to be understood that the preparation of the composition is not restricted to the exact procedure above outlined. For example, the sequence of steps and the quantities of materials added may be changed.

The resultant composition, as is apparent from the preceding, is in the form of a plastic mass. It may be employed in this condition or, if desired, it may be molded to form packings of predetermined shapes and sizes. One specific procedure for producing a molded composition is set forth in copending application Serial No. 426,072, filed February 5, 1930.

The composition by virtue of the metallic ingredient, i. e. antimony, is resistant to reaction with commercially used chemicals, oils, gases or other fluids. In other words, the composition is itself inert, for an extended period, to reaction with or decomposition from chemicals or other materials with which it may come in contact in its ultimate application. It is also capable of being used for a very large range of temperature, pressure and speeds. It will effectively withstand temperatures up to 1000° F. and even higher.

Because of the above characteristics, the packing is not restricted to a single application. On the contrary, it has practically unlimited application and may be used in substantially all places where packing is necessary. When used between moving mechanical parts, it also functions as a lubricant.

As is apparent from the foregoing, the composition may be easily, economically and conveniently prepared. It does not require any extensive apparatus, processing or labor.

Since it is obvious that various modifications and changes may be made in the above-described process, I do not intend to limit this invention to the exact details described except as defined in the appended claims.

This application is a continuation-in-part of my prior application, Serial No. 520,455, filed March 5, 1931.

I claim:

1. A packing composition for different industrial uses including lubricating purposes and capable of use in a loose or molded state containing 5% to 75% by weight of powdered unalloyed metallic antimony as the metallic ingredient.

2. A packing composition for different industrial uses including lubricating purposes and capable of use in a loose or molded state containing 5% to 75% by weight of 200 mesh unalloyed metallic antimony as the metallic ingredient.

3. A packing compostion for different industrial uses including lubricating purposes and capable of use in a loose or molded state comprising at least 5% of powdered unalloyed antimony.

4. A packing compostion for different industrial uses including lubricating purposes and capable of use in a loose or molded state comprising 20% to 30% of powdered unalloyed antimony.

5. A packing composition for different industrial uses including lubricating purposes and capable of use in a loose or molded state comprising 30% to 50% of powdered unalloyed antimony.

6. A packing composition for different industrial uses including lubricating purposes and capable of use in a loose or molded state comprising 60% of powdered unalloyed antimony.

7. A packing composition for different industrial uses including lubricating purposes and capable of use in a loose or molded state comprising 75% of powdered unalloyed antimony.

GEORGE B. JACK, Jr.